(12) United States Patent
Stirling-Gallacher et al.

(10) Patent No.: US 7,689,242 B2
(45) Date of Patent: Mar. 30, 2010

(54) CHANNEL ESTIMATOR FOR OFDM SYSTEM

(75) Inventors: Richard Stirling-Gallacher, Stuttgart (DE); Zhaocheng Wang, Stuttgart (DE); Thomas Dölle, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 727 days.

(21) Appl. No.: 09/897,910

(22) Filed: Jul. 3, 2001

(65) Prior Publication Data
US 2002/0001352 A1   Jan. 3, 2002

(30) Foreign Application Priority Data
Jul. 5, 2000 (EP) .................................. 00114424

(51) Int. Cl.
*H04M 1/00* (2006.01)
(52) U.S. Cl. .............. 455/550.1; 455/63.1; 455/67.13; 455/306; 455/307; 375/260; 375/316
(58) Field of Classification Search ............. 370/208, 370/342; 455/63.1, 65, 67.11, 67.13, 278.1, 455/296, 213, 286, 306–307, 334, 339, 550.1, 455/130; 375/260, 340, 347, 341, 316, 343, 375/346, 350, 232
See application file for complete search history.

(56) References Cited
U.S. PATENT DOCUMENTS

| 5,375,123 | A |   | 12/1994 | Andersson |         |
|-----------|---|---|---------|-----------|---------|
| 5,533,063 | A | * | 7/1996  | Mitra et al. | 375/340 |
| 5,905,946 | A |   | 5/1999  | Lilleberg et al. |     |
| 5,912,876 | A |   | 6/1999  | H'mimy    |         |
| 5,973,642 | A |   | 10/1999 | Li et al. |         |
| 6,047,171 | A | * | 4/2000  | Khayrallah et al. | 455/266 |
| 6,327,314 | B1 | * | 12/2001 | Cimini et al. | 375/340 |
| 6,463,105 | B1 | * | 10/2002 | Ramesh    | 375/262 |
| 6,487,253 | B1 | * | 11/2002 | Jones et al. | 375/260 |
| 6,654,429 | B1 | * | 11/2003 | Li        | 375/316 |

FOREIGN PATENT DOCUMENTS

EP    0 499 560 B1   8/1992

(Continued)

OTHER PUBLICATIONS

Mignone V et al: "CD3-0FDM: A New Channel Estimation Method to Improve the Spectrum Efficiency in Digital Terrestrial Television Systems" International Broadcasting Convention 1994, Sep. 14, 1995, XP000617513.

(Continued)

*Primary Examiner*—Raymond S Dean
(74) *Attorney, Agent, or Firm*—Oblon, Spivak, McClelland, Maier & Neustadt, L.L.P.

(57) ABSTRACT

The present invention relates to a device for receiving signals in a wireless cellular OFDM system, in which data symbols are transmitted in frequency subcarriers and timeslots. The present invention further relates to a method for channel estimation in such a device. According to the present invention, a channel estimation on the basis of received pilot symbols is performed, whereby the channel estimation for data symbols between pilot symbols is performed by means of a filter, said filter being selected from a set of filters on the basis of an interference reference value.

10 Claims, 3 Drawing Sheets

FOREIGN PATENT DOCUMENTS

| | | |
|---|---|---|
| EP | 0 711 044 A2 | 5/1996 |
| EP | 0 773 643 | 5/1997 |
| EP | 0 987 831 A1 | 3/2000 |
| EP | 1 030 488 | 8/2000 |
| WO | WO 98/32268 | 7/1998 |

OTHER PUBLICATIONS

Peter Hoeher, et al., "Two-Dimensional Pilot-Symbol-Aided Channel Estimation by Wiener Filtering", IEEE, 1997, pp. 1845-1848.

Takeshi Onizawa, et al., "A Simple Adaptive Channel Estimation Scheme for OFDM Systems", IEEE, 1999, pp. 279-283.

Jan-Jaap vav de Beek, et al., "On Channel Estimation in OFDM Systems", IEEE, 1995, pp. 815-819.

J. Stott, "The effects of phase noise in COFDM", BBC Research & Development, EBU Technical Review, Summer 1998, pp. 1-22.

Patrick Robertson, et al., "Analysis of the Effects of Phase-Noise in Orthogonal Frequency Division Multiplex (OFDM) Systems", IEEE, 1995, pp. 1652-1657.

Fatin Said, et al., "Linear Two Dimensional Pilot Assisted Channel Estimation for OFDM Systems", IEE, Mar. 29-Apr. 1, 1998, pp. 32-36.

\* cited by examiner

CHANNEL ESTIMATOR FOR OFDM SYSTEM

The present invention relates to the channel estimation in a wireless orthogonal frequency division multiplex (OFDM) system. Particularly, the present invention relates to a device for receiving signals in a wireless cellular OFDM system and to a method for channel estimation in such a device.

Figure 1:
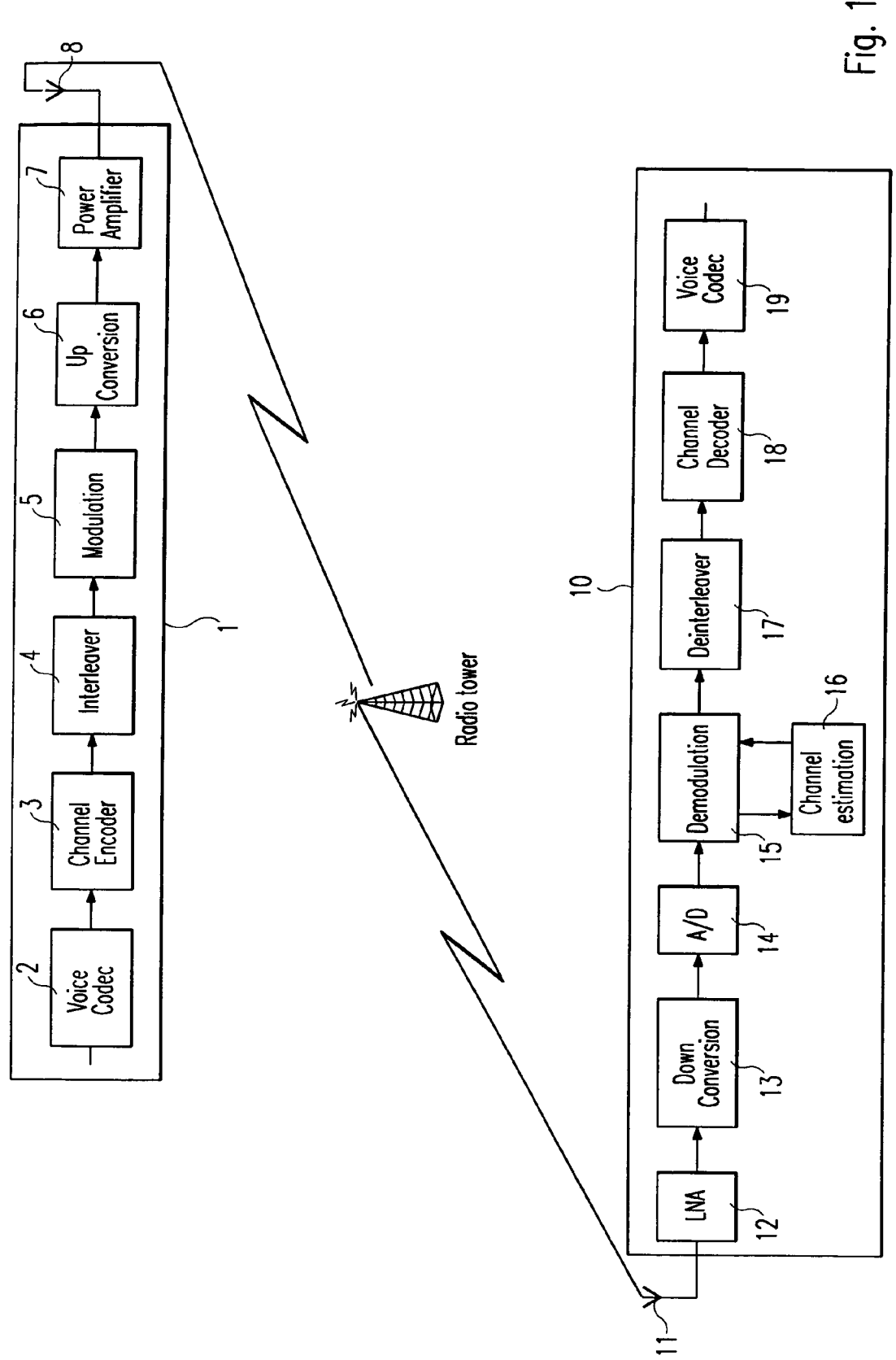

A general wireless communication system comprising a transmitting device 1, such as a base station, and a receiving device 10, such as a mobile terminal, is shown in FIG. 1. The transmitting device 1 comprises all necessary and known elements for the operation in a wireless communication system, such as a voice codec 2, a channel encoder 3, an interleaver 4, a modulation means 5, an upconversion means 6, a power amplifier 7 and an antenna 8. In case that the transmitting device 1 is part of a base station of a wireless communication system, the base station further comprises all necessary elements for receiving signals and for processing the received signals.

Signals transmitted via the antenna 8 of the transmitting device 1 are wirelessly transmitted to a receiving device 10 of the wireless telecommunication system, optionally with the support of an intermediate amplifying radio tower. The receiving device 10 of the wireless communication system comprises all necessary elements for the operation in the wireless communication system, such as an antenna 11, a low-noise amplifier 12, a downconversion means 13, an A/D-converter 14, a demodulation means 15, channel estimation means 16, a deinterleaver 17, a channel decoder 18 and a voice codec 19. In case that the receiving device 10 is part of a mobile terminal of the wireless telecommunication system, the mobile terminal further comprises all necessary elements for transmitting signals in the communication system.

The channel estimation means 16 performs a channel estimation for the transmission channels between the transmitting device 1 and the receiving device 10 in order to ensure a good transmission quality. In case of the present invention, an orthogonal frequency division multiplex (OFDM) wireless communication system is addressed, in which the transmission frequency band is divided in a plurality of frequency subcarriers, whereby adjacent frequency-subcarriers are respectively orthogonal to each other. The frequency subcarriers are transmitted in respectively succeeding time slots, so that the entire transmission pattern of frequency subcarriers in timeslots can be represented as a frequency/time grid like the one shown in FIG. 2.

Figure 2:
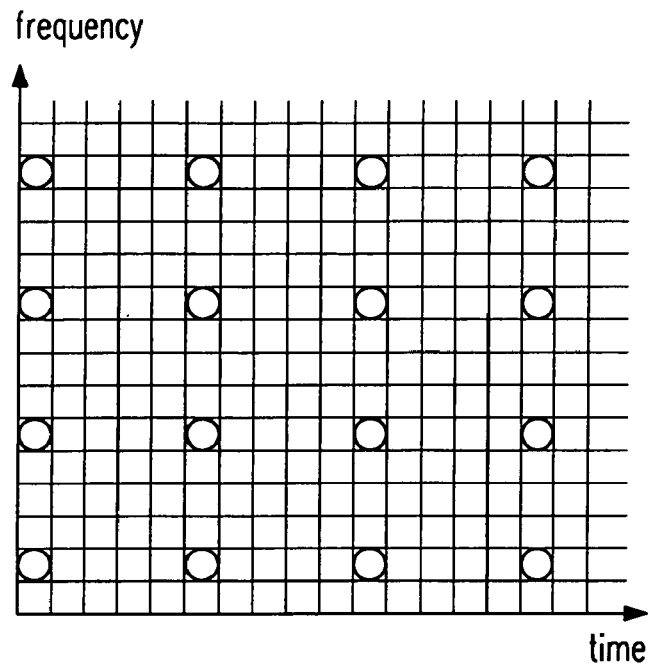

For the channel estimation in OFDM-systems using coherent modulation, various approaches have been proposed. Most of the approaches use pilot symbols placed in the frequency subcarrier/time grid for a channel estimation at the receiving side. FIG. 2 shows an example of a regular distribution of pilot symbols in the frequency subcarrier/time grid of an OFDM system. The pilot symbols are hereby labelled by circles. In the regular distribution of the pilot symbols shown as an example in FIG. 2, the pilot symbols are transmitted in some frequency subcarriers at respectively the same equidistant timepoints. The squares between adjacent pilot symbols in time and frequency dimension represent frequency subcarrier/timeslot allocations for the transmission of data symbols.

In the following, the principle of a standard channel estimation method in an OFDM communication system is described. An OFDM signal received in a receiving device of the OFDM system after a Fast-Fourier transformation for a subcarrier x and a timeslot i can be represented by $$r_{x,i} = s_{x,i} \times h_{x,i} + n_{x,i}$$

whereby $s_{x,i}$ is the transmitted data, $h_{x,i}$ is the complex channel response and $n_{x,i}$ is the additive white Gaussian noise for the frequency subcarrier x and the timeslot i.

For almost all channel estimation schemes, the first step is to use the knowledge of the transmitted pilot symbols and the received signals to perform a channel estimation at the frequency subcarrier/timeslot location of the pilot symbol. Assumed that the pilot symbols are located at the frequency carrier position x' and the timeslot position i', an initial channel estimation can be formed by $$\hat{h}_{x,i} = \frac{r_{x',i'}}{s_{x',i'}}$$

to obtain the channel estimation values for the frequency subcarriers and the timeslots located between the pilot symbols (in frequency and/or in time dimension), a filter is usually used. This filter can have several general forms, which include a one-dimensional form (in frequency or time), a two-dimensional form (in frequency and time), a two-one-dimensional form (first frequency and then time or vice versa), and the like. Further, the filter itself can have fixed or variable coefficients.

For the sake of clarity of the following description, a fixed coefficient and one-dimensional filter in the frequency domain is used as an example, although the present invention applies to any type of filters. For the example of a fixed coefficient and one-dimensional filter in the frequency domain, the following expression can be used to yield the channel estimation $\hat{h}_{x,i}$ at the data symbol locations (frequency subcarrier x and timeslot i) between the pilot symbols:

$$\hat{h}_{x,i} = w_x^T h'_i$$

whereby $w_x^T$ is the transpose of the filter column vector for the frequency subcarrier x and $h'_i$ is a column vector which contains a substrate of a size N of the initial estimates at the pilot symbol locations $\hat{h}_{x',i'}$, N being an integer number.

Figure 3:
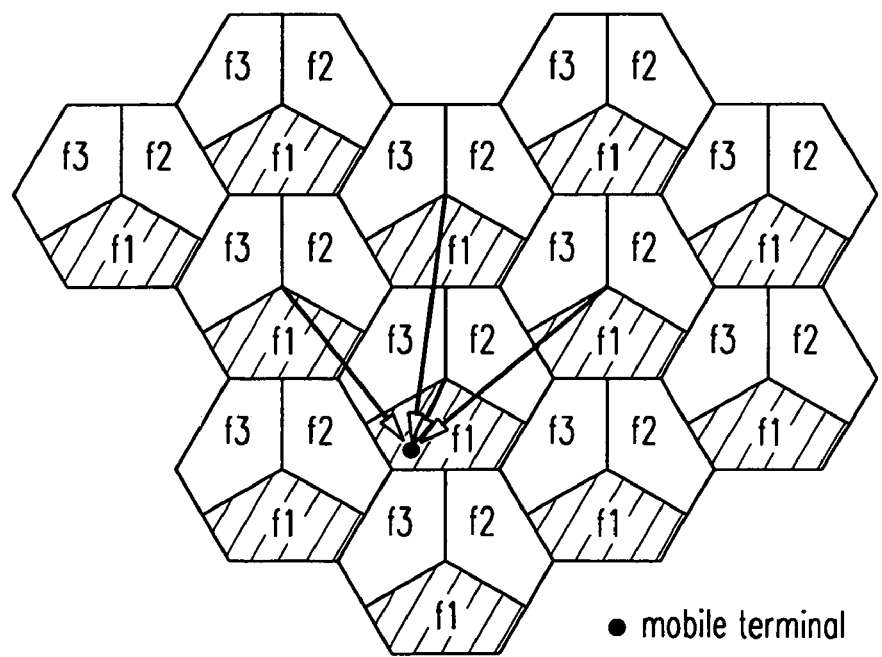

The problem here is that it is difficult to know which filter coefficients to use in the filter and how large the subset N should be, since these parameters depend on the channel conditions. In order to combat this problem for filtering across the frequency domain, it has been proposed to use a fixed filter of a certain length which is selected from a set of filters depending on two parameters. The first parameter is the amplitude of the received signal at the frequency carrier x and the timeslot i. The second parameter is the difference vector between adjacent frequency subcarriers in the frequency domain. Here, the amplitude is used as a measurement of the reliability of the channel estimation. This is a valid assumption when the signal-to-noise ratio is high and there is no interference. However, for a cellular communication system, which consists of a number of cells, received signals are subject to interference from other cells. An example of a cellular communication system with a re-use factor of 3 is shown in FIG. 3. The frequency re-use factor FRF equals 3, since the entire frequency band F used in the communication system consists of the three frequency subbands f1+f2+f3, and in each cell all three frequency bands are used. As can be seen from FIG. 3, each cell is divided in three sectors, whereby each of the subfrequencies f1, f2 and f3, respectively is used in one of the sectors. The arrows in FIG. 3 indicate sources of interference (base stations) from neighbouring cells to the mobile terminal indicated as a point. As can be seen, a mobile terminal located within a subsection, in which the frequency f1 is used, is subject to interference from f1 subsections of neighbouring cells.

The object of the present invention is therefore to propose a device for receiving signals in a wireless cellular OFDM system and a method for channel estimation in such a wireless cellular OFDM system, in which the reliability of the channel estimation is ensured.

The above object is achieved by a device for receiving signals in a wireless cellular OFDM system, in which data symbols are transmitted in frequency subcarriers and timeslots, according to claim 1, comprising channel estimation means for performing a channel estimation on the basis of received pilot symbols, whereby the channel estimation for data symbols between pilot symbols is performed by means of a filter, said filter being selected from a set of filters on the basis of an interference reference value.

The above object is further achieved by a method for channel estimation in a wireless cellular OFDM system, in which data symbols are transmitted in frequency subcarriers in timeslots, according to claim 7, whereby a channel estimation on the basis of received pilot symbols is performed, whereby the channel estimation for data symbols between pilot symbols is performed by means of a filter, said filter being selected from a set of filters on the basis of an interference reference value.

The selection of a filter for the channel estimation depending on an interference reference value ensures a reliable and efficient channel estimation, since the interference from neighbouring cells of the cellular system is taken into consideration.

Further advantageous features are claimed in the respective subclaims.

Advantageously, the filter is selected from a set of filters on the basis of an estimated carrier-to-interference ratio. Thereby, the estimated carrier-to-interference ratio at the frequency subcarrier and the timeslots of the data symbol to be channel estimated is used for the filter selection. Advantageously, the estimated carrier is a wanted carrier power value at the frequency subcarrier and the timeslot of the data per symbol to be channel estimated. Besides the interference reference value, a further parameter characterizing channel characteristics can be used for the selection of the filter. In case that the filter to be selected is a frequency filter, the filter is further selected on the basis of a difference vector between frequency subcarriers adjacent to the frequency subcarrier of the data symbol to be channel estimated. In case that said filter to be selected is to be a time filter, the filter is further selected on the basis of a doppler frequency of the data symbol to be channel estimated.

The present invention thus proposes a simple and effective adaptive selection of an estimation filter for the channel estimation in the cellular OFDM communication system.

Figure 4:
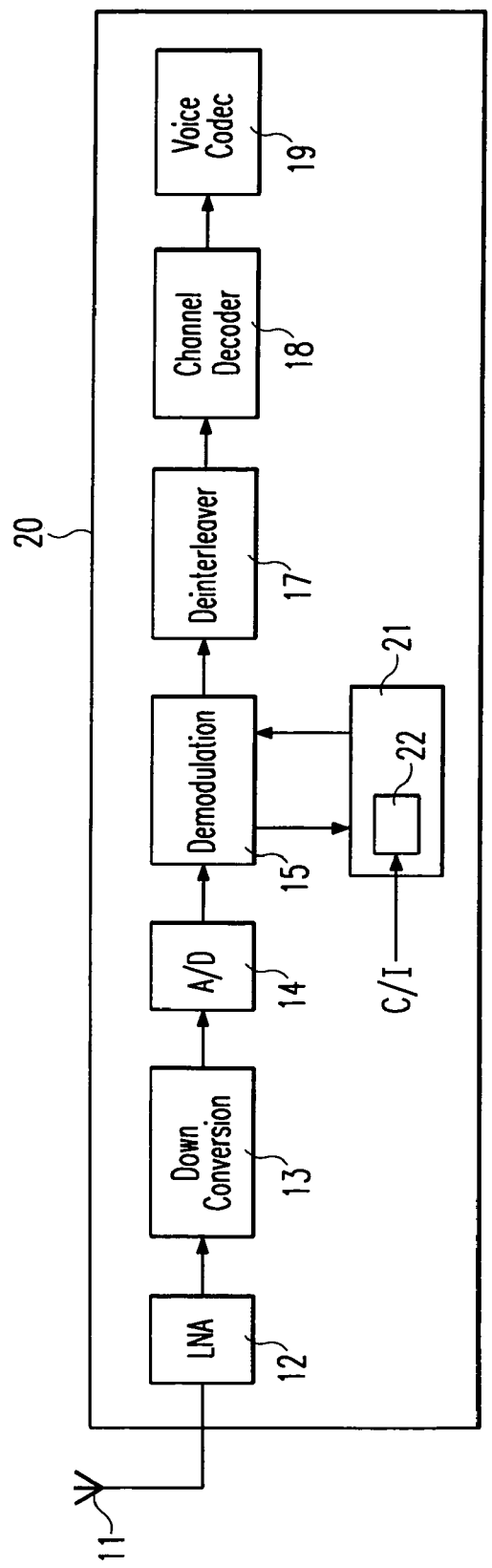

The present invention is further explained in more detail in relation to the enclosed drawings, in which FIG. 1 schematically shows a wireless communication system including a transmitting device and a receiving device, FIG. 2 shows a subcarrier frequency and timeslot grid of an OFDM communication system with an example for a regular pilot symbol distribution, FIG. 3 schematically shows an example of a cellular OFDM communication system with a frequency re-use factor of 3, and FIG. 4 schematically shows a receiving device for a wireless cellular OFDM system according to the present invention.

In FIG. 4, a schematic example of a receiving device 20 for a wireless cellular OFDM system is shown. The shown receiving device 20 can e.g. be part of a mobile terminal of the wireless cellular OFDM system, in which case the mobile terminal further comprises all necessary elements for transmitting signals in the OFDM system. It is further to be noted, that the receiving device 20 shown in FIG. 4 only shows elements necessary for the understanding of the present invention.

The general structure of the receiving device 20 shown in FIG. 4 corresponds to the one of the receiving device 10 of the communication system shown in FIG. 1 and identical elements are characterised by the same reference numerals. The main difference between the receiving device 20 of FIG. 4 and the receiving device 10 of FIG. 1 is the structure of the channel estimation means 21. The channel estimation means 21 of the receiving device 20 according to the present invention performs a channel estimation on the basis of received pilot symbols, whereby the channel estimation for data symbols between pilot symbols is performed by means of a filter, similar to the channel estimation means 16 of the known receiving device 10 shown in FIG. 1. In difference thereto, the channel estimation means 21 of the receiving device 20 according to the present invention comprises a filter selection means 22, which selects the filter for the channel estimation from a set of available filters on the basis of an interference reference value supplied to the filter selection means 22.

In the embodiment of the present invention shown in FIG. 4, an estimated carrier-to-interference ratio (C/I) at the frequency subcarrier x and the timeslot i of the data symbol to be channel estimated is supplied to and used by the filter selecting means 22 to perform the channel estimation. Particularly, the estimated carrier is a wanted or expected carrier power at the frequency subcarrier x and the timeslot i of the data symbol to be channel estimated. The interference value is an interference reference value. The estimated carrier-to-interference ratio (C/I) is as a value known and used in common communication devices and can be measured in different ways.

Beside the estimated carrier-to-interference ratio (C/I), the filter selecting means 22 further uses specific channel characteristics to select an appropriate filter for the channel estimation of the data symbol. The specific channel characteristics can e.g. be a difference vector between frequency subcarriers adjacent to the frequency subcarrier of the data symbol to be channel estimated in case that the filter to be selected is to be a frequency filter. Alternatively, if the filter to be selected is to be a time filter, the specific channel characteristics can be a Doppler frequency of the estimated channel. In case that the filter to be selected is a time and a frequency filter, a difference vector between frequency subcarriers as well as a Doppler frequency can be used as the specific channel characteristics, on which the filter selection is based together with the estimated carrier-to-interference ratio. For example, the filter to be used for the channel estimation may therefore be a variable length estimation filter, whose length depends on the estimated carrier-to-interference ratio and the channel characteristics. The set of filters may in case comprise several filters of the same filter type but with different lengths. Alternatively or additionally, the set of filters from which the channel estimation filter is to be selected can comprise different types of filters commonly used as channel estimation filters in an OFDM system.

Thus, the present invention enables a channel estimation filter size and type to be optimised accordingly to the interference conditions and the channel characteristics in a wireless cellular OFDM system, whereby the effect of intercell interference is considered so that a reliable channel estimation can be performed.

The invention claimed is:

1. A device for receiving signals in a wireless cellular orthogonal frequency division multiplex (OFDM) system, in which data symbols are transmitted in frequency subcarriers and timeslots, comprising:
   a channel estimator configured to perform a channel estimation on the basis of received pilot symbols, the channel estimator including a filter selector configured to adaptively select a filter for channel estimation from a plurality of available filters based on an interference reference value supplied to the filter selector; and
   a filter configured to perform a channel estimation for data symbols between pilot symbols, said filter being further adaptively selected from the plurality of available filters on the basis of a Doppler frequency of the data symbol to be channel estimated, said channel estimation being based on an estimated carrier to interference value ratio, said estimated carrier being a wanted carrier power value at a frequency subcarrier and a timeslot of a data symbol to be channel estimated.

2. The device according to claim 1, wherein the filter selector is further configured to adaptively select the filter based on the estimated carrier to interference ratio at the frequency subcarrier and the timeslot of the data symbol to be channel estimated.

3. The device according to claim 2, wherein, if said filter to be selected is to be a frequency filter, said filter selector selects said filter based on a difference vector between frequency subcarriers adjacent to the frequency subcarrier of the data symbol to be channel estimated.

4. The device according to claim 2, wherein, if said filter to be selected is to be a time filter, said filter selector selects said filter based on a Doppler frequency of the estimated channel.

5. A method for channel estimation in a wireless cellular orthogonal frequency division multiplex (OFDM) system, in which data symbols are transmitted in frequency subcarriers and timeslots, comprising:
   performing a channel estimation on the basis of received pilot symbols;
   performing, adaptively, a filter selection for channel estimation by a filter selector, the filter selector selecting from a plurality of available filters based on an interference reference value supplied to the filter selector; and
   performing, by a filter, a channel estimation for data symbols between pilot symbols, said filter being further adaptively selected from the plurality of available filters based on a Doppler frequency of the data symbol to be channel estimated, said channel estimation being based on an estimated carrier to interference value ratio, the estimated carrier being a wanted carrier power value at a frequency subcarrier and a timeslot of a data symbol to be channel estimated.

6. The method according to claim 5, wherein said performing, adaptively, a filter selection may be further performed based on the estimated carrier to interference ratio at the frequency subcarrier and the timeslot of the data symbol to be channel estimated.

7. The method according to claim 6, wherein, if said filter to be selected is a frequency filter, said filter is further selected on the basis of a difference vector between frequency subcarriers adjacent to the frequency subcarrier of the data symbol to be channel estimated.

8. The method according to claim 6, wherein, if said filter to be selected is to be a time filter, said filter is further selected on the basis of a Doppler frequency of the estimated channel.

9. The method according to claim 5, wherein said filter is selected from among a set of filters based on the estimated carrier to interference ratio and a difference vector between frequency subcarriers adjacent to the frequency subcarrier of the data symbol to be channel estimated.

10. The device according to claim 2, wherein said filter is selected from among a set of filters based on the estimated carrier to interference ratio and a difference vector between frequency subcarriers adjacent to the frequency subcarrier of the data symbol to be channel estimated.

* * * * *